March 18, 1969     H. M. HOLT ET AL     3,434,033
TRANSIENT-COMPENSATED SCR INVERTER
Filed April 17, 1967
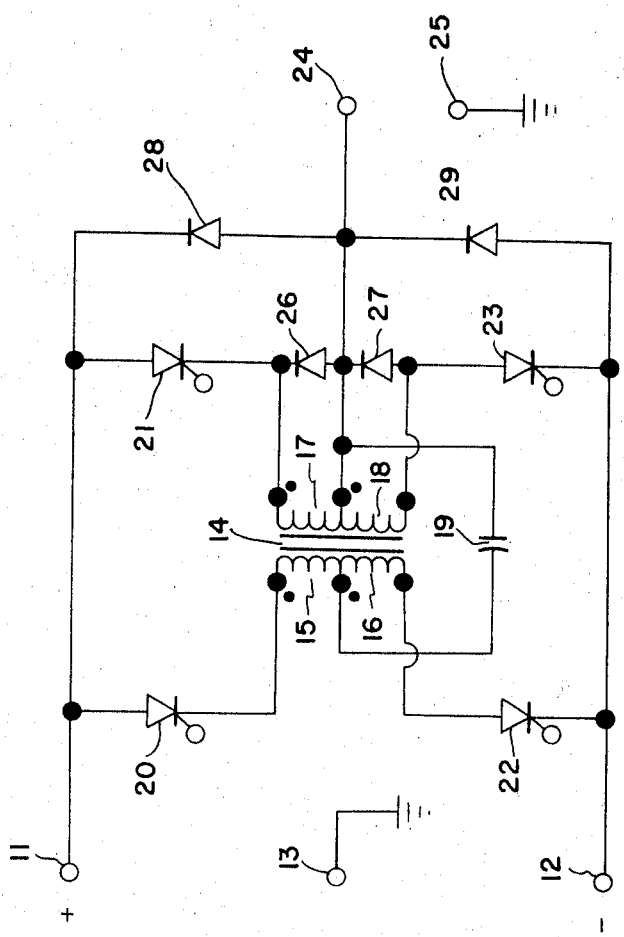
INVENTORS
HUGH M. HOLT
EUGENE L. KELSEY
STACEY M. MILLS
BY
ATTORNEYS

United States Patent Office 3,434,033
Patented Mar. 18, 1969

---

3,434,033
TRANSIENT-COMPENSATED SCR INVERTER
Hugh M. Holt, Williamsburg, Eugene L. Kelsey, Newport News, and Stacey M. Mills, Hampton, Va., assignors to the United States of America as represented by the Administrator of the National Aeronautics and Space Administration
Filed Apr. 17, 1967, Ser. No. 632,154
U.S. Cl. 321—11       4 Claims
Int. Cl. H02m 1/18

ABSTRACT OF THE DISCLOSURE

A silicon-controlled rectifier (SCR) inverter in which transients produced in the inverter are compensated for so that the SCR's in the inverter are not subject to false gating by the transients. A transformer is used in the inverter to produce voltages that oppose the transients and thereby cancel or decrease the amplitudes of the transients.

---

The invention described herein was made by employees of the United States Government and may be manufactured and used by or for the Government for governmental purposes without the payment of any royalties thereon or therefor.

The invention relates generally to a silicon-controlled rectifier (SCR) inverter and more specifically concerns an SCR inverter that compensates for transients generated at the cathodes of the SCR's.

This invention consists of an improvement of the well known McMurray inverter. The McMurray inverter includes positive and negative D.C. power supplies. A first and a second SCR are connected in series between the positive and negative D.C. supplies, and a third and a fourth SCR are connected in series between the positive and negative D.C. power supplies. The junction of the first and second SCR's and the junction of the third and fourth SCR's are connected together by an inductance coil and a capacitor connected in series. By applying appropriate gating pulses to the gates of the first, second, third, and fourth SCR's, an A.C. voltage is produced at the junction of the third and fourth SCR's. A big disadvantage of the McMurray inverter is that the first and third SCRs a're subject to false gating. When the second SCR is gated on, the negative power supply is connected directly to the cathode of the first SCR. This rapid transition of voltage can be interpreted by the first SCR as a gating signal and consequently will conduct; hence the positive D.C. voltage is connected directly to the negative D.C. voltage. Also when the fourth SCR is gated on, the negative D.C. power supply is connected directly to the cathode of the third SCR and can turn it on when it should remain off. This false gating is a function of the D.C. voltage level supplied to the inverter. It is desirable that the transients produced by the turning on of the second and fourth SCR's be eliminated so that the first and third SCR's are not subject to false gating.

It is, therefore, an object of this invention to provide circuitry for eliminating the unwanted transients produced in an SCR inverter.

Other objects and advantages of this invention will further become apparent hereinafter and in the drawing, in which the sole figure is an electrical schematic of an embodiment of the invention.

In describing the embodiment of the invention illustrated in the drawing, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawing, the numbers 11, 12, and 13 designated the input terminals to the inverter. Terminal 13 is connected to ground, a positive D.C. power supply is connected between terminals 11 and 13, and a negative D.C. power supply is connected between terminals 12 and 13. A transformer 14, which is the heart of the present invention, consists of four windings 15, 16, 17 and 18, that are all wound on the same core. A change in voltage across any of the four windings induces a voltage across the other three windings. Windings 15 and 16 are connected in series and windings 17 and 18 are connected in series. A capacitor 19 is connected between the junction of windings 15 and 16, and the junction of windings 17 and 18. An SCR 20 and an SCR 21 have their anodes connected to the positive power supply and their cathodes connected to winding 15 and 17, respectively; an SCR 22 and an SCR 23 have their cathodes connected to the negative power supply and their anodes connected to windings 16 and 18, respectively. An output terminal 24 is connected to the junction of windings 17 and 18 and an output terminal 25 is connected to ground. A diode 26 is connected across winding 17 and a diode 27 is connected across winding 18. A diode 28 is connected between the output terminal 24 and the positive power supply and a diode 29 is connected between the negative power supply and output terminal 24.

In the operation of the transient compensated SCR inverter, output terminal 24 is switched between the positive and negative power supplies by alternately gating SCR's 21 and 23. Output frequency and quasi-square dwell angle are controlled by logic circuitry (not shown) which provides gating pulses to SCR's 20, 21, 22 and 23. The gating pulses must be coupled to the SCR gate cathode leads by pulse transformers. To begin the positive half cycle, SCR 21 is gated into conduction and current flows from the positive power supply to output terminal 24 through winding 17. At the same time that SCR 21 is gated, SCR 22 is also gated and current flows through windings 17 and 16 to the negative power supply. This current charges the commutating capacitor 19 to the polarity shown in the drawing. When capacitor 19 has been fully charged the current through SCR 22 decreases to zero and SCR 22 turns off. At the end of the positive half cycle, SCR 21 must be turned off. To accomplish this, SCR 20 is gated on. The resulting voltage at output terminal 24 due to the positive power supply and the stored charge on capacitor 19 is in excess of the anode voltage on SCR 21 thereby causing SCR 21 to turn off. The current pulses supplied to the load by capacitor 19 and winding 15 must be of sufficient time duration to allow SCR 21 to return to the blocking mode. When the load voltage increases above the positive power supply voltage, feedback diode 28 conducts preventing large voltage spikes on the output waveform. SCR 20 is automatically turned off by the falloff of the commutating pulse. When SCR 21 is forced off, a reverse voltage buildup across winding 17 is prevented by diode 26.

For the negative half cycle, the circuit section is similar. SCR's 20 and 23 are gated on, the capacitor 19 is charged to the opposite polarity and SCR 23 provides power to the load from the negative power supply. SCR 23 is commutated off by gating SCR 22 into conduction. The feedback diodes 28 and 29, besides helping during commutation, also serve as paths for reactive load current.

The advantages of the transient compensated SCR inverter over prior art is due primarily to the transformer action of transformer 14. This transformer action cancels transients that normally cause unwanted gating of the SCR's. For example, at the beginning of positive half cycle, SCR's 21 and 22 are gated into conduction. Because of the conduction of SCR 22, the negative power supply is applied through SCR 22 and windings 16 and 15 to the cathode of SCR 20. Ordinarily this might cause SCR 20 to turn on. However, because of the conduction of SCR 21 the change in current in winding 17 induces voltages across windings 15 and 16 which cancel the transient effect of the negative power supply on the cathode of SCR 20. The transformer windings also serve as *di/dt* protection for the SCR's and commutation inductance. Previously these components were in addition to any protective networks used.

What is claimed is:

1. A transient compensated SCR inverter comprising: positive and negative D.C. power supplies; a transformer consisting of first, second, third, and fourth windings with a change in voltage across any of the windings inducing a voltage across each of the other three windings and with the first and second windings, and the third and fourth windings connected in series; a first SCR connected between said positive power supply and said first winding; a second SCR connected between said second winding and said negative power supply; a third SCR connected between said positive power supply and said third winding; a fourth SCR connected between said fourth winding and said negative power supply; and capacitor means connected between the junction of said first and second windings and the junction of said third and fourth windings whereby when said first, second, third, and fourth SCR's are appropriately gated to produce an A.C. voltage at the junction of said third and fourth windings said transformer compensates for transients produced at the cathodes of said first and third SCR's to insure that the transients will not gate the SCR's.

2. A transient compensated SCR inverter according to claim 1 wherein a first diode is connected between the negative power supply and the junction of the third and fourth windings, and a second diode is connected between the junction of the third and fourth windings and the positive power supply whereby the amplitude of the output A.C. voltage cannot exceed either the negative power supply voltage or the positive power supply voltage.

3. A transient compensated SCR inverter according to claim 1 wherein diodes are connected across said third and fourth windings to prevent reverse voltage buildups across these windings when said third and fourth SCR's are forced off.

4. An improvement of an SCR inverter which includes positive and negative power supplies, first and second SCR's connected in series between the power supplies, third and fourth SCR's connected in series between the power supplies, and an inductance coil and a capacitor connected in series between the junction of said first and second SCR's and the junction of said third and fourth SCR's wherein the improvement comprises the substitution for said inductance coil a transformer having first, second, third, and fourth windings such that a change of voltage across either of the windings induces a voltage across the other three windings, said first and second windings connected in series, and said third and fourth windings connected in series, said capacitor connected between the junction of said first and second windings and the junction of said third and fourth windings, said first, second, third, and fourth windings connected to said first, second, third, and fourth SCR's, respectively, whereby transients produced in said inverter which might cause false gating of the SCR's are compensated for by said transformer.

References Cited

UNITED STATES PATENTS

| 3,207,974 | 9/1965 | McMurray | 321—45 |
| 3,355,654 | 11/1967 | Risberg | 321—44 |

JOHN F. COUCH, *Primary Examiner.*

W. M. SHOOP, *Assistant Examiner.*

U.S. Cl. X.R.

321—45